United States Patent [19]

Donner

[11] Patent Number: 4,987,920
[45] Date of Patent: Jan. 29, 1991

[54] DIAPHRAGM ACTUATED VALVE ASSEMBLY

[75] Inventor: Richard A. Donner, Hanover Park, Ill.

[73] Assignee: Eaton Corporation, Cleveland, Ohio

[21] Appl. No.: 516,494

[22] Filed: Apr. 25, 1990

[51] Int. Cl.$^5$ .......................... F16K 31/06; B08B 9/00; F16K 51/00
[52] U.S. Cl. .................................. 137/242; 15/256.5; 92/98 D; 251/30.03; 251/30.05; 251/46
[58] Field of Search ............. 92/96 R, 98 D; 137/242, 137/244; 251/30.03, 30.04, 30.05, 45, 46; 15/256.5; 222/148

[56] References Cited

U.S. PATENT DOCUMENTS

| | | | |
|---|---|---|---|
| 1,621,638 | 3/1927 | McIntyre et al. | 137/242 |
| 2,623,542 | 12/1952 | Obermaier | 251/30.03 |
| 2,784,732 | 3/1957 | Nurkiewicz | 137/244 |
| 3,593,956 | 7/1971 | McCarty, Jr. | 251/30.03 |
| 3,672,627 | 6/1972 | McCarty, Jr. et al. | 251/30.03 |
| 3,768,771 | 10/1973 | Dicken, Jr. | 137/242 |
| 3,918,477 | 11/1975 | Grams | 137/242 |
| 4,387,878 | 6/1983 | Zukausky | 251/30.03 |
| 4,500,067 | 2/1985 | Zukausky | 251/45 |
| 4,844,112 | 7/1989 | Pick et al. | 251/30.05 |

Primary Examiner—George L. Walton
Attorney, Agent, or Firm—R. A. Johnston

[57] ABSTRACT

A pilot operated, diaphragm actuated fluid valve assembly having an annular main valve seat with a tapered annular surface disposed therearound. A movable diaphragm has a generally flat central main valving surface thereon and an integrally formed annular wiper extending outwardly therefrom. The annular wiper contacts the tapered annular surface a relatively small distance before the main valving surface contacts the main valve seat.

3 Claims, 2 Drawing Sheets

DIAPHRAGM ACTUATED VALVE ASSEMBLY

BACKGROUND OF THE INVENTION

The present invention relates to fluid valves of the pilot operated type having a diaphragm actuated main valve and particularly to valves of the type having the pilot valve member electrically energized. Valves of this type are commonly employed for controlling water inlet flow to household appliances such as washing machines and dish washers.

Typically, in appliance water inlet valves, an electromagnetic actuator such as a solenoid coil moves the pilot valve member to permit water at line pressure in a pilot chamber to discharge to the outlet thereby creating a pressure differential across a flexible diaphragm having the central portion thereof acting as a main valve. Forces of the pressure differential acting across the surfaces of the diaphragm then move the diaphragm to open the main valve permitting a larger flow to the outlet. Such solenoid operated pilot valves draw a very low current and therefore can be energized and deenergized by a set of electrical contacts operated by a small timing motor driven programmer.

Valves of this type are relatively low in manufacturing costs and are readily manufactured in very high volume mass production for the residential appliance industry.

In designing pilot operated diaphragm actuated valves for appliance water inlet, problems have been encountered with leakage across the main valve seating surface often caused by the trapping of foreign particles in the water supply on the main valve seat thereby preventing the valve from closing altogether.

Thus it has been desired to find a way or means of proving the reliability of closing of a pilot operated diaphragm actuated valve assembly without requiring complete redesign and retooling of the valve.

SUMMARY OF THE INVENTION

The present invention provides a pilot operated diaphragm actuated fluid valve of the type having the central portion of the diaphragm contacting an annular valve seat for closing the main valve, with a pilot valve orifice disposed centrally of the annular main valve seat. The peripheral portions of the diaphragm are flexible to permit the central flat portion to be moved between an open position spaced from and a closed position contacting the annular valve seat.

The annular valve seat has disposed therearound a secondary annular preferably conically tapered surface which is contacted by an annular flexible wiper formed integrally with and extending outwardly from the main valve seat on the diaphragm. As the main valve nears the closed position, the annular wiper makes sliding contact with the secondary surface providing sealing and preferably wiping of foreign material from the valve seat conically tapered region. The annular wiper is maintained in a stretched and sealed condition against the tapered surface thereby providing redundant sealing for the main valve.

The present invention thus provides an improved pilot operated diaphragm actuated valve assembly having a tapered surface surrounding the annular valve seat with an annular wiper slidably contacting the tapered surface to provide redundant sealing immediately prior to closing of the main valve.

SUMMARY OF THE INVENTION

Figure 1:
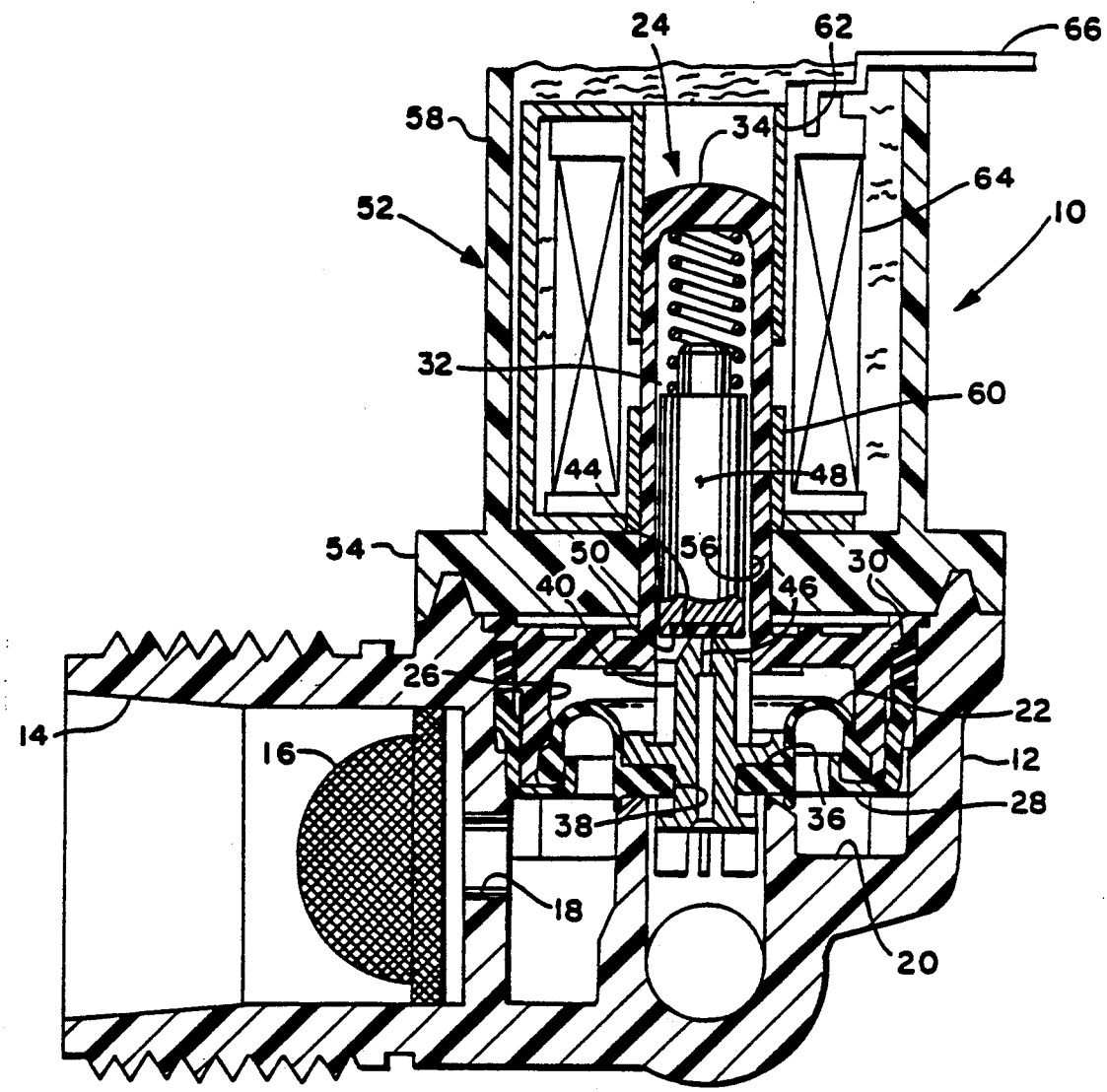
FIG. 1 is a cross-sectional view of a valve assembly employing the present invention; and, FIG. 2 is an enlarged view of a portion of FIG. 1.

The valve assembly of the present invention is indicated generally at 10 having a body 12 formed of suitable plastic material with an inlet 14 formed therein with a filter screen 16. The inlet 14 communicates through passage 18 with a main valving chamber 20. The valving chamber 20 is closed by a flexible diaphragm 22 having the periphery thereof sealed about the rim of a bell-shaped armature guide member indicated generally at 24, with the diaphragm sealed about the rim enlarged diameter portion 26 thereof. The rim of the diaphragm is retained on the rim of the enlarged diameter portion 26 of the armature guide by a suitable annular band 28 having a generally U-shaped cross section. The band 28 and the enlarged portion 26 of the armature are sealed in the valving cavity 20 by a suitable sealing ring 30.

The upper portion of armature guide 24 comprises a reduced diameter hollow tubular portion 32 having the upper end 34 thereof closed.

The flexible diaphragm 22 has a thickened center portion 36 which has a generally flat undersurface 37 and a central aperture 38 formed therethrough. A rigid insert 40 is received through aperture 38 which insert has a pilot valve seat 42 provided on the upper end thereof with a central pilot passage 46 provided therethrough.

A movable valve member is slidably received in the hollow interior of the upper portion 32 of the armature guide 24 and comprises ferromagnetic armature 48 having an elastomeric pad 50 provided in the lower end thereof which contacts the pilot valve seat 44.

The armature guide 24 is retained in the body by an annular cup member indicated generally at 52 which has a thickened closed end portion having a radially outwardly extending flange 54 which is sealed over the body and retained thereon by suitable weldment. The upper tubular portion 32 of the armature guide extends through an aperture 56 provided in the cup member.

The upper cylindrical wall portion 58 of the cup 52 has received therein tubular ferromagnetic pole pieces 60, 62, which pole pieces are separated by an axial air gap. A suitable electrical solenoid coil 64 is received thereover and is potted in the cup 52. Suitable electrical terminals such as terminal strip 64 extend from coil 64 outwardly of the cup for electrical connection thereto.

Figure 2:
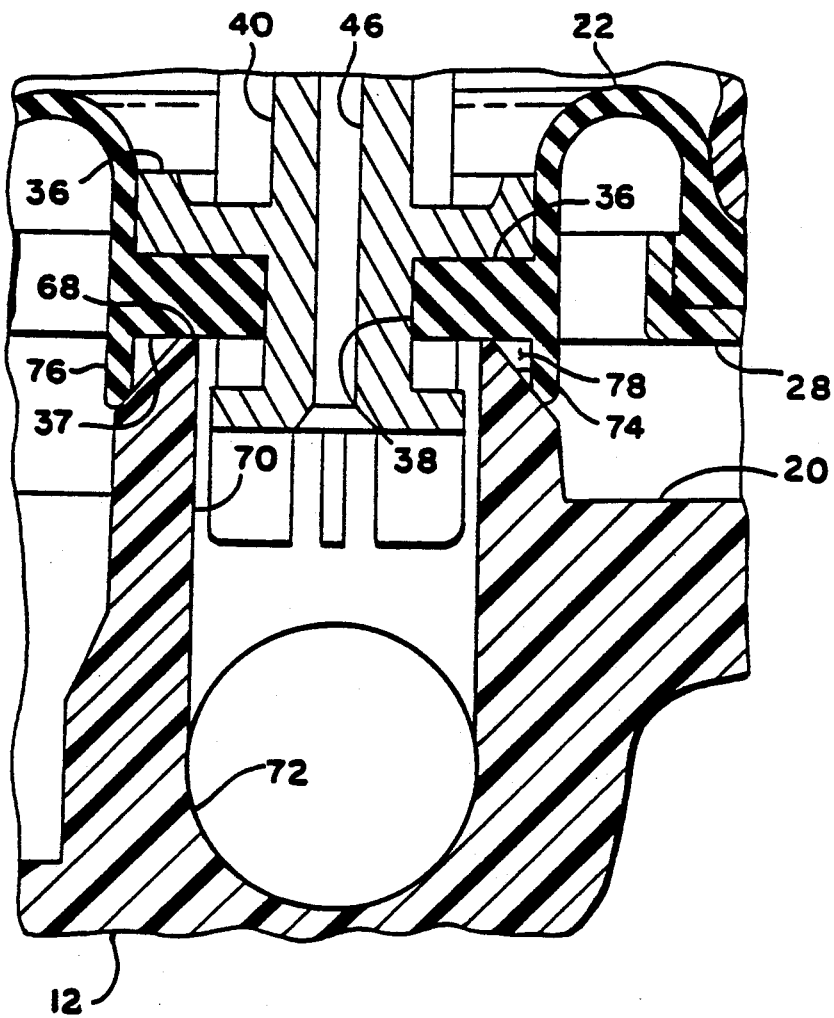

Referring particularly to FIG. 2, the valving cavity 20 has formed therein an annular main valve seat 68 which surrounds and communicates with outlet passage 70 which is open to the valve outlet 72.

The pilot passage 46 of insert 40 also communicates with passage 70 through the diaphragm central portion 36.

The main valve valve seat 68 is contacted by the undersurface 37 of the valving portion 36 of the diaphragm when the valve is in the closed position as shown in the drawings.

It will be understood that the main valve seat 37 is moved upwardly away from seat 68 when the valve is in the open position.

The main valve seat 68 is surrounded radially outwardly thereof by a secondary preferably tapered surface 74 extending downwardly therefrom.

An annular wiper portion 76 is formed integrally with the undersurface 37 of the diaphragm and the wiper 76 has the rim thereof sized and configured to contact the tapered surface 74 prior to the closing of the main valve member against seat 68 such that the wiper 76 seals preferably slidably along surface 74 and is stretched outwardly as the main valving surface 37 seats against main valve seat 68. The wiper 76 thus provides a redundant sealing of the main valve. The region between the wiper 76 and the main valve seat 68, denoted by reference numeral 78, provides a suitable annular space to trap foreign particles which may have passed through the screen 16 and which might otherwise prevent the main valve seat from being closed.

The wiper 76 thus enables an existing valve design to be modified by changing only the taper of the conical surface 74 and the addition of the wiper 76 to the flexible diaphragm to provide for improved redundant sealing of the main valve and provides protection against lodgement of foreign particles which might prevent the valve from fully closing.

Although the invention has hereinabove been described with respect to the illustrated embodiments, it will be understood that the invention is limited only by the following claims:

I claim:

1. An improved valve assembly for a valve of the type having a pressure responsive diaphragm:
   (a) body structure defining a valve outlet port with an annular valve seating surface thereabout and having a second surface radially outwardly of an intersecting said annular seating surface;
   (b) a flexible diaphragm having the periphery thereof sealingly secured to said body structure and a central portion movable between a position contacting and a position spaced from said annular seating surface;
   (c) annular flexible wiper means attached to said diaphragm and extending therefrom in a direction toward said second annular surface, said wiper means configured such that upon movement of said diaphragm intermediate portion said wiper means contacts said second annular surface in fluid pressure sealing arrangement before said diaphragm intermediate portion closes on said annular seating surface said wiper means thereby providing redundant sealing with said annular sealing surface; and,
   (d) means operative to move said diaphragm valving surface between said open and closed position, and forming an annular space as said wiper means engages said second annular surface for trapping foreign particles continuously as said diaphragm intermediate portion contacts said annular seating surface which prevents such particles from being trapped on said annular seating surface which might prevent said diaphragm intermediate portion from closing.

2. The valve assembly defined in claim 1, wherein said wiper means slidably contacts said second annular surface and is deformed radially outwardly as said intermediate portion closes on said annular seating surfaces.

3. A valve assembly of the type employing a pressure responsive member movable for controlling flow to an outlet:
   (a) body structure defining a valving chamber adapted for being supplied with a source of fluid, said valving chamber having an annular valve seat for controlling flow to an outlet communicating with said valving chamber;
   (b) a flexible diaphragm having the periphery thereof sealingly attached to said body structure and thereby forming a movable wall portion for said valving chamber;
   (c) a valving surface provided on said diaphragm, for movement between a closed position contacting said annular seating surface for blocking flow to said outlet and an open position permitting flow to said outlet;
   (d) an annular secondary surface disposed radially outwardly of said annular valve seat; and,
   (e) annular wiper means extending from said diaphragm and surrounding said diaphragm valving surface, said wiper means operative upon movement of said diaphragm to contact said annular secondary surface before said valving surface contacts said annular valve seat and, seals thereabout said wiper means resiliently deformed by continued movement of said valving surface to the closed position, said wiper thereby providing redundant sealing with said diaphragm valving surface, and forming an annular space as said wiper means engages said annular secondary surface for trapping foreign particles continuously as said diaphragm valving surface contacts said annular valve seat which prevents such particles from being trapped on said annular valve seat which might prevent said diaphragm valving surface from closing.

* * * * *